US011069244B2

(12) United States Patent
Kim et al.

(10) Patent No.: US 11,069,244 B2
(45) Date of Patent: Jul. 20, 2021

(54) APPARATUS AND METHOD FOR IMPLEMENTING LCDAS

(71) Applicants: HYUNDAI MOTOR COMPANY, Seoul (KR); KIA MOTORS CORPORATION, Seoul (KR)

(72) Inventors: Yoon Soo Kim, Suwon-si (KR); Seung Wook Park, Yongin-si (KR); Min Byeong Lee, Seongnam-si (KR); In Yong Jung, Suwon-si (KR); Jae Sung Cho, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 111 days.

(21) Appl. No.: 15/833,893

(22) Filed: Dec. 6, 2017

(65) Prior Publication Data

US 2018/0190124 A1  Jul. 5, 2018

(30) Foreign Application Priority Data

Dec. 30, 2016  (KR) .......................... 10-2016-0184304

(51) Int. Cl.
*B60G 17/018* (2006.01)
*B60G 23/00* (2006.01)
(Continued)

(52) U.S. Cl.
CPC .......... *G08G 1/167* (2013.01); *B60G 17/0162* (2013.01); *B60G 17/0165* (2013.01);
(Continued)

(58) Field of Classification Search
CPC ...... G08G 1/167; B60W 50/14; B60W 30/02; B60W 10/22; B60W 30/18163;
(Continued)

(56) References Cited

U.S. PATENT DOCUMENTS 9,305,463 B1 * 4/2016 Yellambalase ......... H04N 7/181
9,487,139 B1 * 11/2016 Ishida ................... B60W 50/14
(Continued)

FOREIGN PATENT DOCUMENTS

DE  102011088164 A1  6/2013
DE  102012108563 A1  3/2014
(Continued)

OTHER PUBLICATIONS

Extended European Search Report dated May 28, 2018 issued in European Patent Application No. 17205376.1.
Korean Office Action dated Feb. 5, 2018 issued in Korean Patent Application No. 10-2016-0184304 (with English translation).
Office Action issued in Korean Application No. 10-2016-0184304 dated Oct. 17, 2018.

*Primary Examiner* — Harry Y Oh
(74) *Attorney, Agent, or Firm* — Morgan, Lewis & Bockius LLP

(57) ABSTRACT

The present disclosure relates to a vehicle and a control method thereof, and more particularly, to an apparatus and a method for implementing a lane change decision aid system (LCDAS). The LCDAS apparatus includes: a sensing device for sensing whether a target vehicle is in adjacent zones of a subject vehicle, whether the target vehicle is in a rear zone of the subject vehicle, or whether the target vehicle is a large vehicle or a compact vehicle; a processor for determining an activation condition for determining whether an LCDAS function is active/inactive and a warning condition for determining whether a warning of the LCDAS function is issued/un-issued, based on a sensing result of the sensing device; a warning device for issuing the warning to a driver based on a determination result of the processor; and a controller for controlling the sensing device, the processor, and the warning device.

20 Claims, 8 Drawing Sheets

(51) Int. Cl.

| | |
|---|---|
| *B62C 3/00* | (2006.01) |
| *B62K 25/00* | (2006.01) |
| *G06F 7/00* | (2006.01) |
| *G06F 17/00* | (2019.01) |
| *G06F 19/00* | (2018.01) |
| *G08G 1/16* | (2006.01) |
| *B60W 50/14* | (2020.01) |
| *B60W 30/02* | (2012.01) |
| *B60W 10/22* | (2006.01) |
| *B60W 30/18* | (2012.01) |
| *B60G 17/016* | (2006.01) |
| *B60G 17/0165* | (2006.01) |
| *B60Q 1/34* | (2006.01) |
| *B60Q 9/00* | (2006.01) |

(52) U.S. Cl.
 CPC ............ *B60Q 1/343* (2013.01); *B60Q 9/008* (2013.01); *B60W 10/22* (2013.01); *B60W 30/02* (2013.01); *B60W 30/18163* (2013.01); *B60W 50/14* (2013.01); *B60G 2400/204* (2013.01); *B60G 2400/40* (2013.01); *B60G 2400/841* (2013.01); *B60G 2500/10* (2013.01); *B60G 2500/30* (2013.01); *B60W 2300/00* (2013.01); *B60W 2520/10* (2013.01); *B60W 2540/18* (2013.01); *B60W 2540/20* (2013.01); *B60W 2554/00* (2020.02); *B60W 2710/18* (2013.01); *B60W 2710/20* (2013.01)

(58) Field of Classification Search
 CPC ......... B60W 2710/20; B60W 2520/10; B60W 2300/00; B60W 2710/18; B60W 2540/20; B60W 2550/10; B60W 2540/18; B60W 10/20; B60W 30/09; B60W 30/0956; B60W 50/16; B60W 2050/146; B60W 2720/10; B60W 2710/226; B60W 2550/30; B60W 2550/12; B60G 17/0162; B60G 17/0165; B60G 2400/204; B60G 2400/40; B60G 2400/841; B60G 2500/10; B60G 2500/30; B60Q 1/343; B60Q 9/008
 See application file for complete search history.

(56) References Cited

U.S. PATENT DOCUMENTS

| | | | |
|---|---|---|---|
| 2005/0168331 A1* | 8/2005 | Gunderson | G01S 13/931 340/468 |
| 2011/0010041 A1* | 1/2011 | Wagner | G01S 13/87 701/31.4 |
| 2011/0291874 A1* | 12/2011 | De Mersseman | B60R 21/0134 342/70 |
| 2012/0296522 A1* | 11/2012 | Otuka | G08G 1/167 701/41 |
| 2014/0324325 A1* | 10/2014 | Schlensag | B60W 30/18163 701/116 |
| 2015/0302586 A1* | 10/2015 | Fukata | G08G 1/165 382/103 |
| 2016/0193971 A1* | 7/2016 | Yellambalase | B60R 11/04 348/148 |
| 2016/0193998 A1* | 7/2016 | Yellambalase | B60R 1/00 348/148 |
| 2016/0196748 A1* | 7/2016 | Yellambalase | B60R 11/04 340/435 |
| 2016/0332569 A1* | 11/2016 | Ishida | B60W 30/08 |
| 2017/0330463 A1* | 11/2017 | Li | B60K 37/04 |
| 2017/0345328 A1* | 11/2017 | Sherony | G09B 9/05 |
| 2018/0029604 A1* | 2/2018 | Niino | B60W 10/20 |
| 2018/0033300 A1* | 2/2018 | Hansen | G08G 1/096844 |
| 2018/0061238 A1* | 3/2018 | Lei | G08G 1/167 |

FOREIGN PATENT DOCUMENTS

| | | | |
|---|---|---|---|
| DE | 102012108563 A1 | * | 3/2014 |
| EP | 2899083 A2 | | 7/2015 |
| JP | H08-241499 A | | 9/1996 |
| JP | H08-332822 A | | 12/1996 |
| JP | H09-188206 A | | 7/1997 |
| JP | 2006-232225 A | | 9/2006 |
| JP | 2006232225 A | * | 9/2006 |
| JP | 2009-012493 A | | 1/2009 |
| JP | 2015-138528 A | | 7/2015 |
| KR | 10-2014-0047939 A | | 4/2014 |
| WO | 2015153811 A1 | | 10/2015 |
| WO | WO-2015153811 A1 | * | 10/2015 |

\* cited by examiner

[Fig. 1]
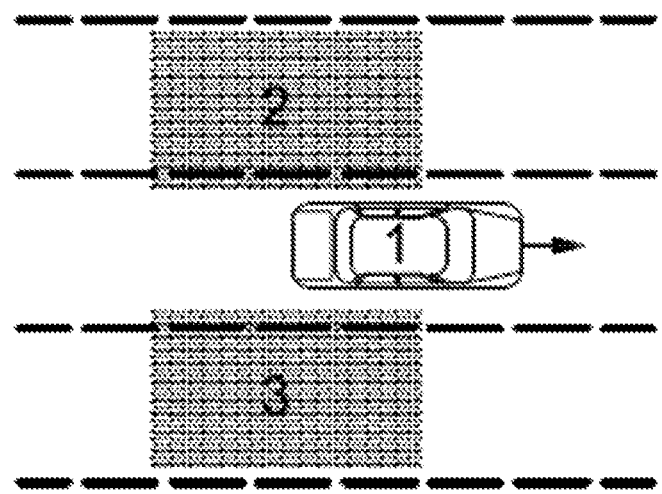
[Fig. 2]
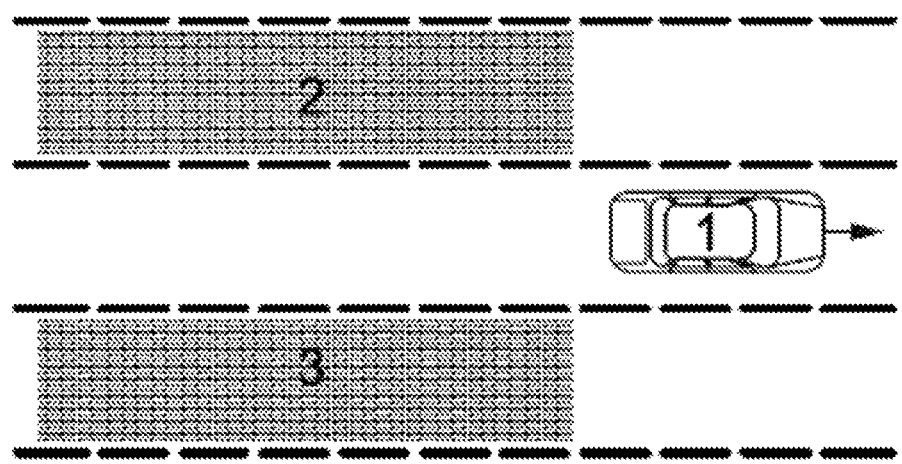

[Fig. 3]
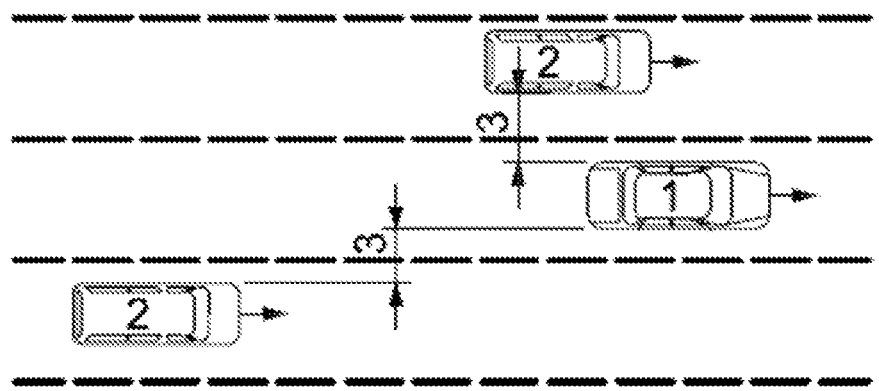
[Fig. 4a]
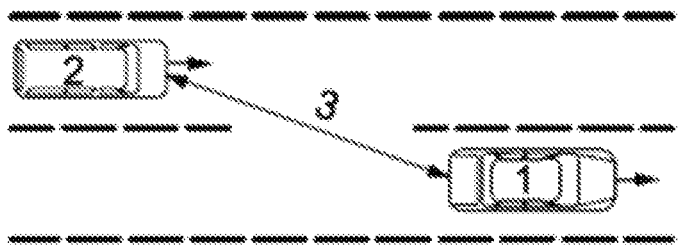
On a straight road measured along
a straight line
[Fig. 4b]
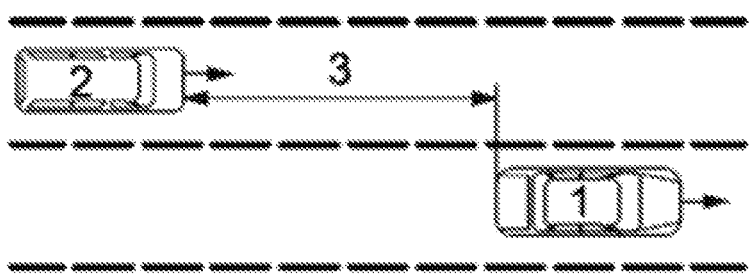
On a straight road estimated along
target vehicle path

[Fig. 4c]
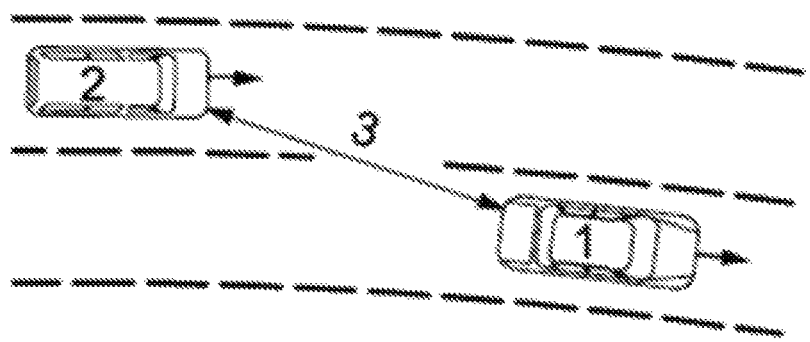
On a curved road measured along a straight line
[Fig. 4d]
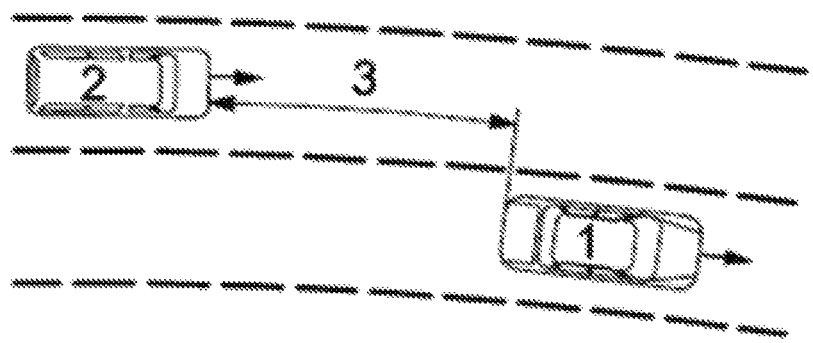
On a curved road estimated along target vehicle path

[Fig. 5]

| Type | Left adjacent zone coverage | Right adjacent zone coverage | Left rear zone coverage | Right rear zone coverage | Function |
|---|---|---|---|---|---|
| I | X | X | | | Blind spot warning |
| II | | | X | X | Closing vehicle warning |
| III | X | X | X | X | Lane change warning |

[Fig. 6]
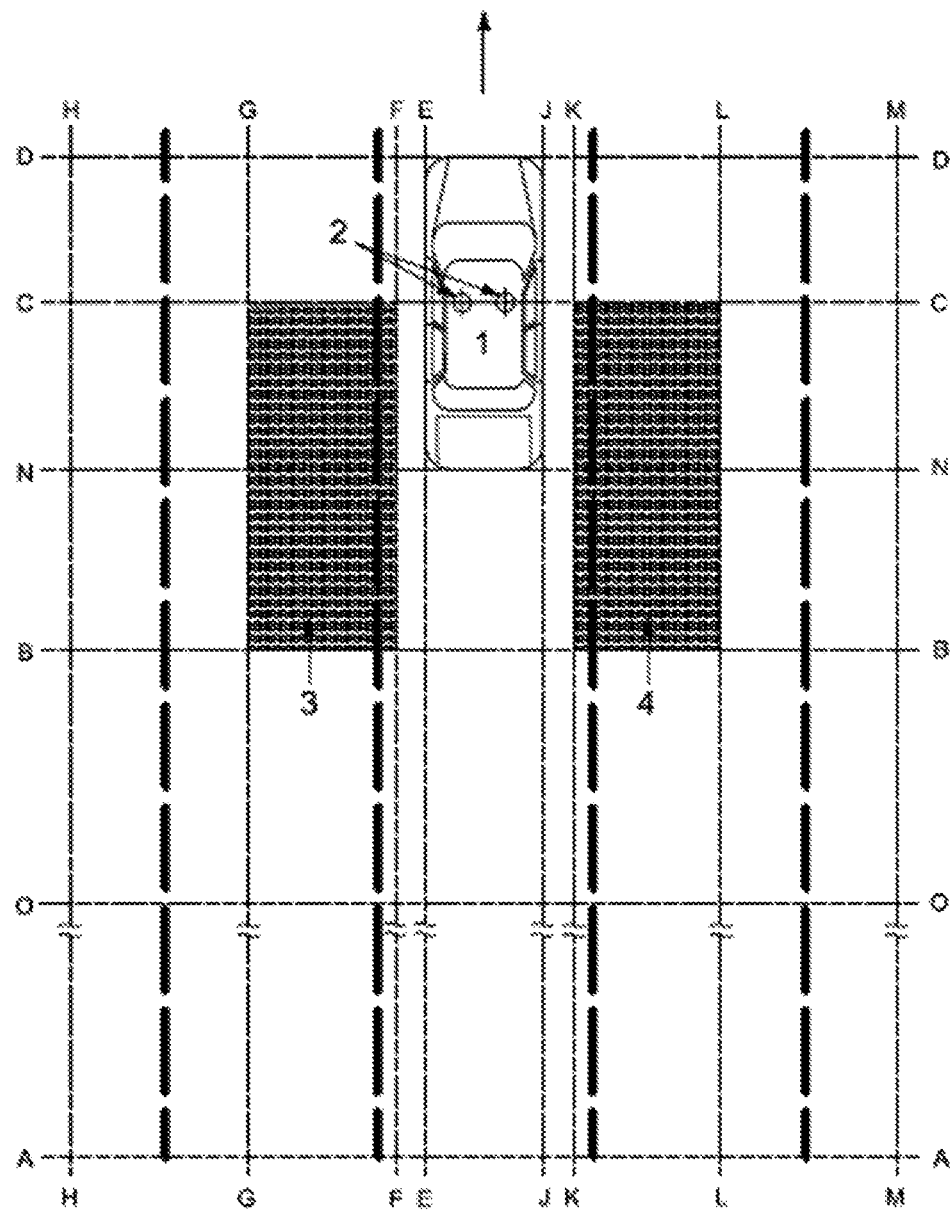

[Fig. 7]
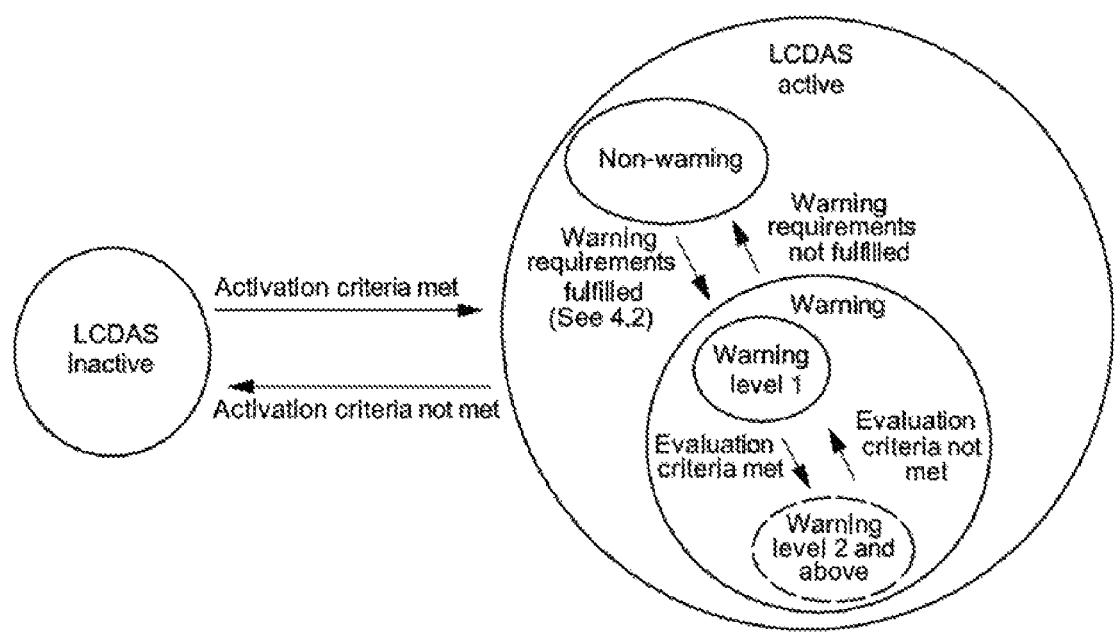

[Fig. 8]
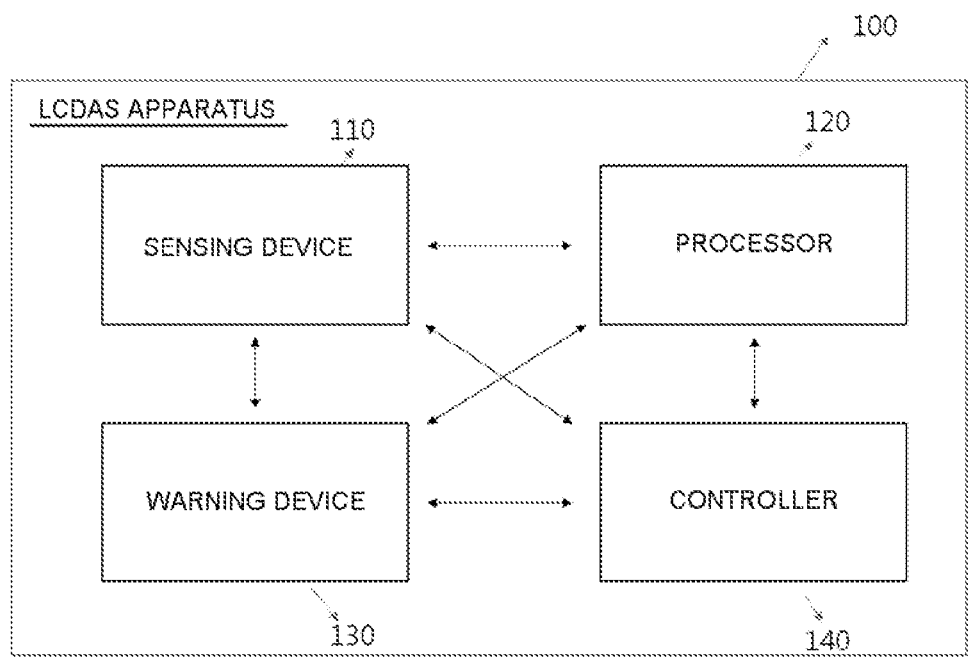

[Fig. 9]
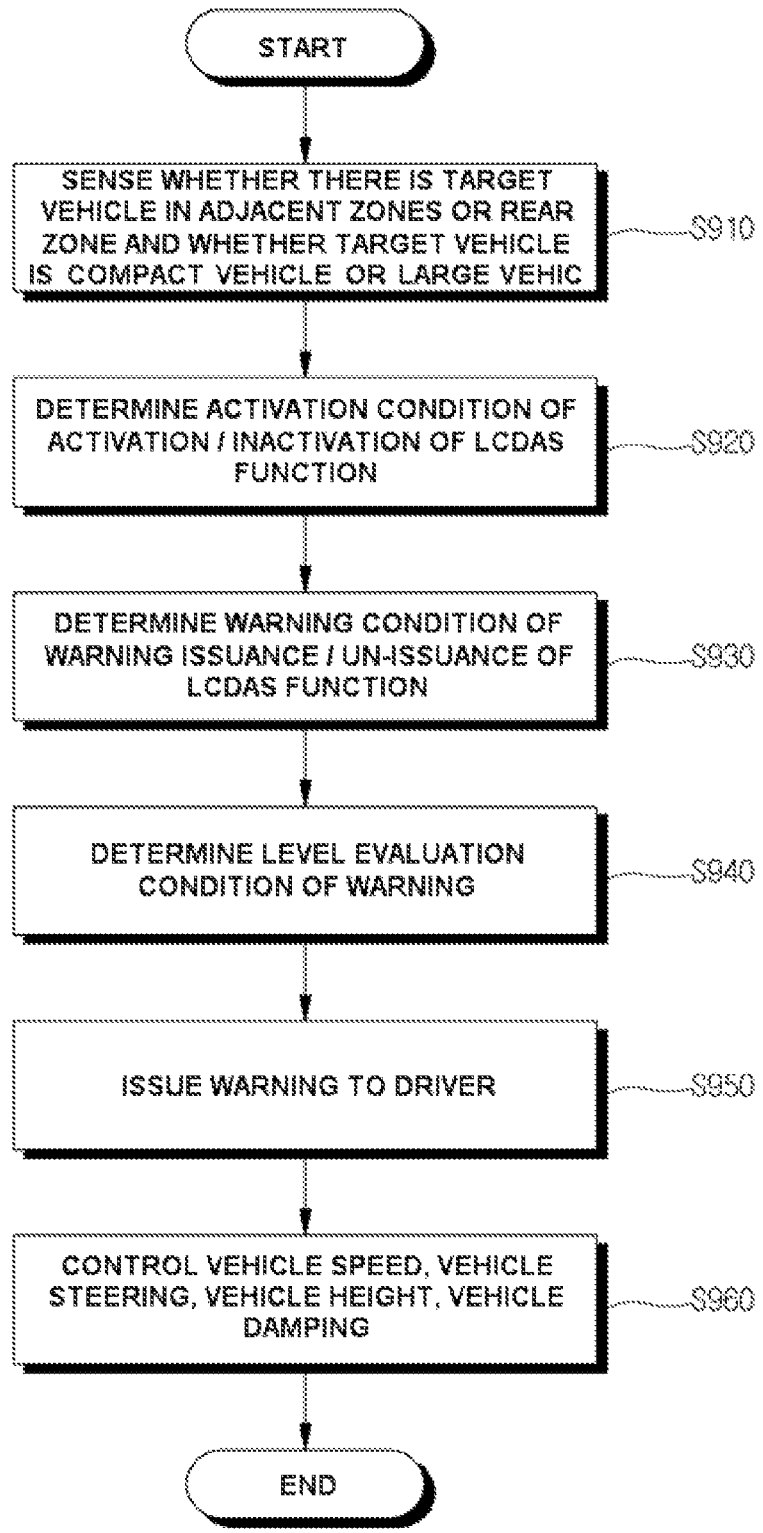

APPARATUS AND METHOD FOR IMPLEMENTING LCDAS

CROSS-REFERENCE TO RELATED APPLICATION(S)

This application is based on and claims the benefit of priority to Korean Patent Application No. 10-2016-0184304, filed on Dec. 30, 2016 with the Korean Intellectual Property Office, the entire disclosure of which is incorporated herein by reference.

TECHNICAL FIELD

Exemplary embodiments of the present disclosure relate to a vehicle and a control method thereof, and more particularly, to an apparatus and a method for implementing a lane change decision aid system (LCDAS).

BACKGROUND

A lane change decision aid system (LCDAS) is one of functions of an advanced driving assistance system (ADAS) and is a system for informing a driver of a collision that may occur when the driver attempts changing a lane. In addition, the LCDAS is a system for detecting a target vehicle existing on the rear and side (left and right) of a subject vehicle. For example, when the driver of the subject vehicle intends to change the lane, the LCDAS evaluates the situation and warns the driver whether a lane change is recommended or not recommended.

Meanwhile, the LCDAS is for assisting roles of rearview mirrors located outside or inside the vehicle, but is not a system substituting the rearview mirrors. In addition, the LCDAS only warns the driver of a predicted accident or collision, but does not activate an automatic control action (e.g., steering control or brake control) to prevent the accident or collision.

Various methods for implementing the LCDAS are provided by automobile related companies.

SUMMARY

An object of the present disclosure is to provide a series of systems for implementing an LCDAS.

Specifically, an object of the present disclosure is to provide an apparatus for implementing an LCDAS.

Another object of the present disclosure is to provide a method for implementing an LCDAS.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, an LCDAS apparatus, includes: a sensing device for sensing whether a target vehicle is in adjacent zones of a subject vehicle, whether the target vehicle is in a rear zone of the subject vehicle, or whether the target vehicle is a large vehicle or a compact vehicle; a processor for determining an activation condition for determining whether an LCDAS function is active/inactive and a warning condition for determining whether a warning of the LCDAS function is issued/un-issued, based on a sensing result of the sensing device; a warning device for issuing the warning to a driver based on a determination result of the processor; and a controller for controlling the sensing device, the processor, and the warning device.

The activation condition may include at least one of: a continuous activation condition of activating the LCDAS function at all times when the subject vehicle starts; a manual switch activation condition of allowing the driver to activate the LCDAS function using a switch operation; a turn signal light activation condition of activating the LCDAS function when the driver turns on a turn signal light; and a subject vehicle speed activation condition of activating the LCDAS function when a speed of the subject vehicle is equal to or greater than a threshold speed value.

The warning condition may include at least one of: a blind spot warning condition of issuing a blind spot warning when the target vehicle is located in the adjacent zones; and a closing vehicle warning condition of issuing a closing vehicle warning when the target vehicle is located in the rear zone and when a maximum closing speed and a collision time of the target vehicle satisfy a preset condition.

The processor may be additionally configured to determine a warning level evaluation condition for evaluating a warning level, and the warning level evaluation condition may include at least one of: a turn signal light evaluation condition determined as a high warning level when the driver turns on the turn signal light; and a steering input evaluation condition determined as the high warning level when the driver manipulates a steering of the subject vehicle.

The warning may include a visual warning at a low warning level and the warning may include a visual warning, an audible warning, and a haptic warning at the high warning level.

The warning may include a visual warning and an audible warning at a low warning level and the warning may include a visual warning, an audible warning, and a haptic warning at the high warning level.

The controller may output a speed control command controlling the speed of the subject vehicle or a steering control command controlling a steering of the subject vehicle, corresponding to an issuance of the blind spot warning or an issuance of the closing vehicle warning.

The processor may additionally determine a lateral wind condition for issuing a lateral wind generation warning, and in the lateral wind condition, when the target vehicle is the compact vehicle, a closing speed of the target vehicle is a positive value, and the target vehicle is in the adjacent zones, the lateral wind generation warning may be issued and the controller may output a command for controlling a damping of the vehicle in response to the lateral wind generation warning.

The processor may additionally determine a lateral wind condition for issuing a lateral wind generation warning and in the lateral wind condition, when the target vehicle is the large vehicle, a closing speed of the target vehicle is a positive value, and the target vehicle is in the rear zone, the lateral wind generation warning may be issued and the controller may output a command for controlling a height of the vehicle to be lowered in response to the lateral wind generation warning.

In the lateral wind condition, when the target vehicle is the large vehicle, the closing speed of the target vehicle is the positive value, and the target vehicle is in the adjacent zones, the lateral wind generation warning may be issued and the controller may output the command for controlling the damping of the vehicle in response to the lateral wind generation warning.

The large vehicle may be any one of a bus, a truck, and a trailer.

In accordance with another aspect of the present disclosure, an LCDAS control method includes steps of: sensing, by a sensing device, whether a target vehicle is in adjacent zones of a subject vehicle, whether the target vehicle is in a rear zone of the subject vehicle, or whether the target vehicle is a large vehicle or a compact vehicle; determining, by a processor, an activation condition for determining whether an LCDAS function is active/inactive based on a sensing result of the sensing device; determining, by a warning device, a warning condition for determining whether the warning of the LCDAS function is issued/un-issued based on the sensing; and issuing a warning to a driver based on a determination result of the processor.

The activation condition may include at least one of: a continuous activation condition of activating the LCDAS function at all times when the subject vehicle starts; a manual switch activation condition of allowing the driver to activate the LCDAS function using a switch operation; a turn signal light activation condition of activating the LCDAS function when the driver turns on a turn signal light; and a subject vehicle speed activation condition of activating the LCDAS function when a speed of the subject vehicle is equal to or greater than a threshold speed value.

The warning condition may include at least one of: a blind spot warning condition of issuing a blind spot warning when the target vehicle is located in the adjacent zones; and a closing vehicle warning condition of issuing a closing vehicle warning when the target vehicle is located in the rear zone and when a maximum closing speed and a collision time of the target vehicle satisfy a preset condition.

The LCDAS control method may further include a step of: determining a warning level evaluation condition for evaluating a warning level, in which the warning level evaluation condition may include at least one of: a turn signal light evaluation condition determined as a high warning level when the driver turns on the turn signal light; and a steering input evaluation condition determined as the high warning level when the driver manipulates a steering of the subject vehicle.

The step of issuing a warning may include: issuing a visual warning at a low warning level; and issuing a visual warning, an audible warning, and a haptic warning at a high warning level.

The LCDAS control method may further include a step of: outputting a command controlling the speed of the subject vehicle or the steering of the subject vehicle, corresponding to an issuance of the blind spot warning or an issuance of the closing vehicle warning.

The LCDAS control method may further include a step of: determining a lateral wind condition for issuing a lateral wind generation warning, in which in the lateral wind condition, when the target vehicle is the compact vehicle, a closing speed of the target vehicle is a positive value, and the target vehicle is in the adjacent zones, the lateral wind generation warning may be issued and a command for controlling a damping of the vehicle in response to the lateral wind generation warning may be output.

The LCDAS control method may further include a step of: determining a lateral wind condition for issuing a lateral wind generation warning, in which in the lateral wind condition, when the target vehicle is the large vehicle, a closing speed of the target vehicle is a positive value, and the target vehicle is in the rear zone, the lateral wind generation warning may be issued and a command for controlling a height of the vehicle to be lowered in response to the lateral wind generation warning may be output.

In the lateral wind condition, when the target vehicle is the large vehicle, the closing speed of the target vehicle is the positive value, and the target vehicle is in the adjacent zones, the lateral wind generation warning may be issued and a command for controlling a damping of the vehicle in response to the lateral wind generation warning may be output.

According to the apparatus for implementing an LCDAS according to the embodiment of the present disclosure, one apparatus capable of implementing the LCDAS may be provided.

According to the method for implementing an LCDAS according to the embodiment of the present disclosure, one control method capable of implementing the LCDAS may be provided.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a view for explaining an adjacent zone in application of an LCDAS according to an embodiment of the present disclosure;

FIG. 2 is a view for explaining a rear zone in the application of the LCDAS according to an embodiment of the present disclosure;

FIG. 3 is a view for explaining a lateral clearance in the application of the LCDAS according to the embodiment of the present disclosure;

FIGS. 4A to 4D are views for explaining a rear region in the application of the LCDAS according to an embodiment of the present disclosure;

FIG. 5 is a view for explaining three types in the application of the LCDAS according to an embodiment of the present disclosure;

FIG. 6 is a diagram for explaining an implementation example of an LCDAS function according to an embodiment of the present disclosure;

FIG. 7 is a diagram for explaining a state change example of the LCDAS according to the embodiment of the present disclosure;

FIG. 8 is a diagram illustrating an LCDAS apparatus according to an embodiment of the present disclosure; and FIG. 9 is a flow chart for explaining an LCDAS control method according to an embodiment of the present disclosure.

DETAILED DESCRIPTION

Hereinafter, exemplary embodiments of the present disclosure will be described in detail with reference to the accompanying drawings so that those skilled in the art may easily practice the present disclosure. As those skilled in the art would realize, the described embodiments may be modified in various different ways, all without departing from the spirit or scope of the present disclosure.

A part irrelevant to the description will be omitted to clearly describe the present disclosure, and the same elements will be designated by the same reference numerals throughout the specification.

Throughout the present specification, when any one part is referred to as being "connected to" another part, it means that any one part and another part are "directly connected to"

each other or are "electrically connected to" each other with the other part interposed therebetween. Further, unless explicitly described to the contrary, "comprising" any components will be understood to imply the inclusion of other components rather than the exclusion of any other components.

The mention that any portion is present "over" another portion means that any portion may be directly formed on another portion or a third portion may be interposed between one portion and another portion. In contrast, the mention that any portion is present "just over" another portion means that a third portion may not be interposed between one portion and another portion.

Terms used throughout the specification, 'first', 'second', 'third', etc. may be used to describe various portions, components, zones, layers, and/or sections but are not limited thereto. These terms are used only to differentiate any portion, component, zone, layer, or section from other portions, components, zones, layers, or sections. Therefore, a first portion, component, zone, layer, or section which will be described below may be mentioned as a second portion, component, zone, layer, or section without departing from the scope of the present disclosure.

Terminologies used herein are to mention only a specific exemplary embodiment, and does not limit the present disclosure. Singular forms used herein include plural forms as long as phrases do not clearly indicate an opposite meaning. A term "including" used in the present specification concretely indicates specific properties, zones, integer numbers, steps, operations, elements, and/or components, and is not to exclude presence or addition of other specific properties, zones, integer numbers, steps, operations, elements and/or components.

The term expressing the relative space of "under", "over", and the like may be used to more easily describe the relationship between other portions of one portion which is illustrated in the drawings. The terms intend to include other meanings or operations of apparatuses which are being used along with the intended meaning in the drawings. For example, overturning the apparatus in the drawings, any portions described as being positioned "under" other portions will be described as being positioned "over" other portions. Therefore, the exemplified term "under" includes both of the up and down directions. An apparatus may rotate by 90° or may rotate at different angles and the term expressing a relative space is interpreted accordingly.

All terms including technical terms and scientific terms used herein have the same meaning as the meaning generally understood by those skilled in the art to which the present disclosure pertains unless defined otherwise. Terms defined in a generally used dictionary are additionally interpreted as having the meaning matched to the related art document and the currently disclosed contents and are not interpreted as ideal or formal meaning unless defined.

Hereinafter, exemplary embodiments of the present disclosure so as to be easily practiced by a person skilled in the art to which the present disclosure pertains will be described in detail with reference to the accompanying drawings. However, the present disclosure may be modified in various different ways and is not limited to embodiments provided in the present description.

Prior to description with the drawings, terms required in an LCDAS according to an embodiment of the present disclosure will be summarized as follows.

A subject vehicle is equipped with an apparatus for implementing an LCDAS and is a vehicle to which the LCDAS according to the present disclosure is applied.

The target vehicle is a vehicle that is considered when the subject vehicle implements an LCDAS function. The target vehicle is generally a vehicle that approaches the subject vehicle from the rear and is present on the rear or the side of the subject vehicle.

A coverage zone indicates all zones to which the LCDAS of the subject vehicle is applied. Specifically, the coverage zone includes adjacent zones and rear zones. The adjacent zones include a left adjacent zone and a right adjacent zone, and the rear zones include a left rear zone and a right rear zone.

The adjacent zones indicate the left and right zones of the subject vehicle, and include a left adjacent zone and a right adjacent zone.

The rear zones indicate a rear zone of the subject vehicle and include a left rear zone and a right rear zone.

The lateral clearance indicates a distance between the side of the subject vehicle and the side of the target vehicle (side near the subject vehicle).

The rear clearance indicates the distance between the rear surface of the subject vehicle and the front surface of the target vehicle. In detail, a backward clearance means a clearance based on a straight line, but in some cases indicates a clearance based on a path of the target vehicle.

The closing speed indicates a difference between the speed of the target vehicle and the speed of the subject vehicle. Therefore, when the closing speed is a positive value, it means that the target vehicle is approaching the subject vehicle from the rear side.

Time to collision means the time taken for the target vehicle to collide with the subject vehicle. Specifically, the collision time may be calculated by dividing the backward clearance by the closing speed.

An overtaking speed indicates a difference between the speed of the subject vehicle and the speed of the target vehicle. Therefore, the overtaking speed having a positive value means that the speed of the subject vehicle is larger than the speed of the target vehicle.

A blind spot warning function indicates a function of detecting whether or not the target vehicle is present in the adjacent zones and warning a driver of the subject vehicle of the detected result.

A closing vehicle warning function is a function of detecting whether there is a vehicle approached from the rear zone and warning the driver of the subject vehicle of the detected result.

A lane change warning function indicates a function that includes both the blind spot warning function and the closing vehicle warning function.

A roadway radius of curvature indicates a horizontal radius of curvature of a road to which the subject vehicle belongs.

FIG. 1 is a view for explaining an adjacent zone in application of an LCDAS according to an embodiment of the present disclosure.

Referring to FIG. 1, a subject vehicle 1 is illustrated. As described above, the adjacent zones include a left adjacent zone 2 and a right adjacent zone 3. That is, the left zone based on a driving direction (arrow direction in FIG. 1) of the subject vehicle 1 is referred to as the left adjacent zone 2 and the right zone based on the driving direction (arrow direction in FIG. 1) of the subject vehicle 1 is referred to as the right adjacent zone 3.

FIG. 2 is a view for explaining a rear zone in the application of the LCDAS according to an embodiment of the present disclosure.

Referring to FIG. 2, the subject vehicle 1 is illustrated. As described above, the rear zones include a left rear zone 2 and a right rear zone 3. That is, the left zone based on a driving direction (arrow direction in FIG. 1) of the subject vehicle 2 is referred to as the left adjacent zone 2 and the right zone based on the driving direction (arrow direction in FIG. 1) of the subject vehicle 2 is referred to as the right adjacent zone 3.

FIG. 3 is a view for explaining a lateral clearance in the application of the LCDAS according to the embodiment of the present disclosure.

Referring to FIG. 1, a subject vehicle 1 is illustrated. As described above, the lateral clearance 3 indicates the distance between the side of the subject vehicle and the side of the target vehicle (side near the subject vehicle). That is, the distance between the side of the target vehicle 2 located on the left based on the driving direction (arrow direction in FIG. 3) of the subject vehicle 1 and the side of the subject vehicle 1 is the lateral clearance 3. Further, the distance between the side of the target vehicle 2 located on the right based on the driving direction (arrow direction in FIG. 3) of the subject vehicle 1 and the side of the subject vehicle 1 is the lateral clearance 3.

FIG. 4 is a view for explaining a rear region in the application of the LCDAS according to an embodiment of the present disclosure.

Referring to FIG. 4, the subject vehicle 1 and the target vehicle 2 are illustrated. As described above, the rear clearance 3 indicates the distance between the rear surface of the subject vehicle and the front surface of the target vehicle.

As illustrated in FIG. 4a, the rear clearance may mean a clearance based on a straight line. In FIG. 4A, a linear distance between the rear surface of the subject vehicle 1 and the front surface of the target vehicle 2 may be referred to as a rear clearance 3.

As illustrated in FIG. 4b, the rear clearance may be referred to as a clearance based on a straight line. As illustrated in FIG. 4B, a distance between an extension of the rear surface of the subject vehicle 1 and the front surface of the target vehicle 2 may be referred to as the rear clearance 3.

As illustrated in FIG. 4C, the backward clearance may be referred to as the clearance 3 based on the path of the target vehicle. In FIG. 4C, the distance between the rear surface of the subject vehicle 1 and the front surface of the target vehicle 2 may be referred to as the rear clearance 3 based on the path of the target vehicle 2.

As illustrated in FIG. 4D, the backward clearance may be referred to as the clearance 3 based on the path of the target vehicle. In FIG. 4D, the distance between the extension of the rear surface of the subject vehicle 1 and the front surface of the target vehicle 2 is measured based on the path of the target vehicle 2 and may be referred to as the rear clearance 3.

FIG. 5 is a view for explaining three types in the application of the LCDAS according to an embodiment of the present disclosure.

The LCDAS according to the embodiment of the present disclosure may be classified into three types (type I, type II, and type III). The type I is an LCDAS type for implementing the blind spot warning function, and the left adjacent zone and the right adjacent zone which are the adjacent zones set to be detection target zones. The type II is the LCDAS type for implementing the closing vehicle warning function, and the left rear zone and the right rear zone which are the rear zones are set to be the detection target zones. The type III is the LCDAS type for implementing the lane change warning function and the lane change warning function includes both of the blind spot warning function and the closing vehicle warning function. Therefore, the type III sets the left adjacent zone and the right adjacent zone which are the adjacent zones and the left rear zone and the right rear zone which are the rear zones to be the detection target zones.

FIG. 6 is a diagram for explaining an implementation example of an LCDAS function according to an embodiment of the present disclosure.

Referring to FIG. 6, the subject vehicle 1, a centre of the 95th percentile eyellipse, the left adjacent zone 3, and the right adjacent zone 4 are illustrated. Referring to FIG. 6, the requirements of the blind spot warning function and the closing vehicle warning function will be described below. However, it should be understood that the lines illustrated in FIG. 6 correspond to examples for description and the technical idea of the present disclosure is not limited thereto.

A line A may be parallel to a trailing edge of the subject vehicle 1 and located 30 m behind from the subject vehicle 1. A line B may be parallel to the trailing edge of the subject vehicle 1 and located 3 m behind from the subject vehicle 1. A line C may be parallel to a leading edge of the subject vehicle 1 and located at a center 2. A line D may be an extension of the leading edge of the subject vehicle 1. A line E is parallel to a center line of the subject vehicle 1 and may be located at a leftmost outermost edge (excluding an external mirror) of a body of the subject vehicle 1. A line F is parallel to the center line of the subject vehicle 1 and may be located 0.5 m left from the leftmost outermost edge of the body of the subject vehicle 1. A line G is parallel to the center line of the subject vehicle 1 and may be located 3 m left from the leftmost outermost edge of the body of the subject vehicle 1. A line H is parallel to the center line of the subject vehicle 1 and may be located 6 m left from the leftmost outermost edge of the body of the subject vehicle 1. A line J is parallel to the center line of the subject vehicle 1 and may be located at a rightmost outermost edge (excluding the external mirror) of the body of the subject vehicle 1. A line K is parallel to the center line of the subject vehicle 1 and may be located 0.5 m right from the rightmost outermost edge of the body of the subject vehicle 1. A line L is parallel to the center line of the subject vehicle 1 and may be located 3 m right from the rightmost outermost edge of the body of the subject vehicle 1. A line M is parallel to the center line of the subject vehicle 1 and may be located 6 m right from the rightmost outermost edge of the body of the subject vehicle 1. A line N may be an extension of the trailing edge of the subject vehicle 1. A line O may be parallel to the trailing edge of the subject vehicle 1 and located 10 m behind from the subject vehicle 1.

The adjacent zones include the left adjacent zone that is a zone partitioned by the line C, the line B, the line G, and the line F. Further, the adjacent zones include the right adjacent zone that is a zone partitioned by the line C, the line B, the line K, and the line L. When the target vehicle exists in the adjacent zone, a warning may be issued to a driver in accordance with the blind spot warning function as described below.

The rear zones include the left rear zone that is a zone partitioned by the line B, the line O, the line G, and the line F. Further, the rear zones include the right rear zone that is a zone partitioned by the line B, the line O, the line K, and the line L. When the target vehicle exists in the rear zone, a warning may be issued to a driver in accordance with the closing vehicle warning function as described below.

The blind spot warning function includes a left blind spot warning function and a right blind spot warning function, and the respective requirements (warning conditions) are as follows. The left blind spot warning function: When the portion of the target vehicle is located in front of the line B, the target vehicle is located behind the line C as a whole, the target vehicle is located on the left of the line F as a whole, and the target vehicle is located on the right of the line G, the warning is issued to the driver. If the target vehicle is not located in the zone defined by the lines A, D, E, and H or if no portion of the target vehicle is located, the left blind spot warning function is not performed. The right blind spot warning function: When the portion of the target vehicle is located in front of the line B, the target vehicle is located behind the line C as a whole, the target vehicle is located on the right of the line K as a whole, and the target vehicle is located on the left of the line L, the warning is issued to the driver. If the target vehicle is not located in the zone defined by the lines A, D, J, and M or if no portion of the target vehicle is located, the right blind spot warning function is not performed. The conditions may be referred to as the blind spot warning condition.

Meanwhile, the blind spot warning function may be selectively suppressed. Specifically, when the subject vehicle passes the target vehicle ahead and the target vehicle enters the adjacent zones from the front, the blind spot warning function may be suppressed for a period in less than two seconds.

The closing vehicle warning function includes a left closing vehicle warning function and a right closing vehicle warning function, and the respective requirements (warning conditions) are as follows. The left closing vehicle warning function: When the target vehicle is located behind the line B as a whole, the target vehicle is located on the left of the line F as a whole, the portion of the target vehicle is located on the right of the line G, and the collision time of the target vehicle is equal to or smaller than the following Table 1, the warning is issued to the driver. The conditions may be referred to as the closing vehicle warning condition.

TABLE 1

| Type | Maximum closing speed of target vehicle (m/s) | Collision time (s) |
| --- | --- | --- |
| A | 10 | 2.5 |
| B | 15 | 3.0 |
| C | 20 | 3.5 |

For example, when the target vehicle is in the left rear zone of the rear of line A and the collision time of the target vehicle is 7.5 s or more, a left closing vehicle warning will not be issued. Further, when the target vehicle is located in front of the line A and the target vehicle is located in front of the line N as a whole or when no part of the target vehicle is in the zone between the lines E and H, the left closing vehicle warning will not be issued.

The right closing vehicle warning function: When the target vehicle is located behind the line B as a whole, the target vehicle is located on the right of the line K as a whole, the portion of the target vehicle is located on the left of the line L, and the collision time of the target vehicle is equal to or smaller than the above Table 1, the warning is issued to the driver.

For example, when the target vehicle is in the right rear zone of the rear of line A and the collision time of the target vehicle is 7.5 s or more, a right closing vehicle warning will not be issued. Further, when the target vehicle is located in front of the line A and the target vehicle is located in front of the line N as a whole or when no part of the target vehicle is in the zone between the lines J and M, the right closing vehicle warning will not be issued.

A lateral wind generation warning function warns that a lateral wind will be generated by the target vehicle that is driving on a lane (right lane or left lane) next to a lane on which the subject vehicle is driving. Specifically, when the target vehicle causes a lateral wind disturbance, the vehicle stability of the subject vehicle is not guaranteed. Regardless of the driver's intention to drive in the lane, the subject vehicle affected by the lateral wind may be affected by an unexpected motion in a yaw or roll direction. The condition for issuing the lateral wind generation warning is as follows.

(1) When the target vehicle is a compact vehicle, the closing speed of the target vehicle is a positive value, and the target vehicle is located in the adjacent zones, the lateral wind generation warning is issued. When the target vehicle is compact vehicles (for example, a passenger car), the amount of lateral wind generated is smaller than that of large vehicles (e.g., bus, truck, trailer, etc.). Also, the closing speed is a value obtained by subtracting the speed of the subject vehicle from the speed of the target vehicle, and the fact that the closing speed is the positive value means that the speed of the target vehicle is faster than that of the subject vehicle. Therefore, when the target vehicle is in the rear zone, no warning is generated and no control is involved. Further, when the target vehicle is in the adjacent zones, the damping of the subject vehicle is controlled. The height control of the garage provides a sense of difference to a driver, while the damping control provides a less sense of difference to the driver, and therefore in the case of the compact vehicle that generates a smaller amount of lateral wind, the stability of the vehicle may be ensured only by the damping control.

(2) When the target vehicle is a large vehicle, the closing speed of the target vehicle is a positive value, and the target vehicle is located in the rear zone, the lateral wind generation warning is issued. When the target vehicle is a large vehicle, the amount of lateral wind generated is larger than that of a compact vehicle. Also, the closing speed is a value obtained by subtracting the speed of the subject vehicle from the speed of the target vehicle, and the fact that the closing speed is the positive value means that the speed of the target vehicle is faster than that of the subject vehicle. Therefore, when the target vehicle (large vehicle) is in the rear zone, the warning is generated and as the control, the control is performed to lower a height of the vehicle.

(3) When the target vehicle is a large vehicle, the closing speed of the target vehicle is a positive value, and the target vehicle is located in the adjacent zones, the lateral wind generation warning is issued. When the target vehicle is a large vehicle, the amount of lateral wind generated is larger than that of a compact vehicle. Also, the closing speed is a value obtained by subtracting the speed of the subject vehicle from the speed of the target vehicle, and the fact that the closing speed is the positive value means that the speed of the target vehicle is faster than that of the subject vehicle. Therefore, when the target vehicle (large vehicle) is in the adjacent zones, the warning is generated and the damping of the subject vehicle is controlled as a control.

Optionally, a bilateral closing vehicle warning may be issued. For example, when the left closing vehicle warning and the right vehicle warning need not be issued, the portion of the target vehicle is between the lines E and J, the target vehicle is located behind the line O as a whole, and the collision time of the target vehicle is smaller than or equal to the above Table 1, the bilateral closing vehicle warning may be issued.

Optionally, the closing vehicle information may be issued. The information includes information about one or more target vehicles as visual information and may be provided to the driver of the subject vehicle at any time, and the information should be clearly distinguished from the warning.

Meanwhile, it is preferable that the time until the warning indication is activated after the warning condition is satisfied is within 300 ms. Further, it is preferable that the time until the warning indication is inactivated after the warning condition is released is within 1 s.

FIG. 7 is a diagram for explaining a state change example of the LCDAS according to the embodiment of the present disclosure.

Referring to FIG. 7, the LCDAS is divided into an inactive state (LCDAS inactive) and an active state (LCDAS active). Specifically, when the activation condition is satisfied, it is changed from the LCDAS inactive state to the LCDAS active state and when the activation condition is not satisfied, it is changed from the LCDAS active state to the LCDAS inactive state. The activation conditions include continuous activation, manual switch activation, turn signal light activation, and subject vehicle speed activation. The continuous activation indicates that the LCDAS function is activated at all times when the vehicle starts. The manual switch activation indicates that the user manually activates the LCDAS using a switch (e.g., toggle switch or menu based interface). The turn signal light activation indicates that the LCDAS is activated when the driver turns on the turn signal light. For example, when the driver turns on a left turn signal light, a right LCDAS may be inactivated while a left LCDAS is activated. The subject vehicle speed activation indicates the activation of the LCDAS based on the speed of the subject vehicle. For example, the LCDAS may be activated if the speed of the subject vehicle is equal to or greater than a threshold speed value. For example, the threshold speed value may be 60 km/h.

The LCDAS active state is classified into a non-warning state and a warning state. The non-warning state is a state in which no warning is indicated to the driver, and the warning state is a state in which a warning is indicated to the driver. When the warning condition is satisfied, the non-warning state is changed to the warning state, and if the warning condition is not satisfied, the warning state is changed to the non-warning state. The warning condition is as described with reference to FIG. 6.

The warning state is classified into a warning level 1 state and a warning level 2 state. The warning level 2 state is a more urgent state than the warning level 1 state. When a condition of evaluating a warning level (warning level evaluation condition) is not satisfied, the state is the warning level 1 state and when the warning level evaluation condition is satisfied, the state may be changed to the warning level 2 state. The warning level evaluation condition is for evaluating whether or not the driver intends to change the lane and reflecting the evaluated result to a degree of warning. The warning in the warning level 1 state may only be a visual warning. However, a warning in the warning level 2 state may additionally issue a visual warning, an audible warning, and a haptic warning. The warning level evaluation condition may include a turn signal light evaluation, a subject vehicle steering input evaluation, a subject vehicle lane location evaluation, and a lateral clearance evaluation. The turn signal light evaluation evaluates whether or not the driver turns on the turn signal light and thus the change to the warning level 2 state is made when the driver turns on the turn signal light. At this point, if the direction of the turn signal light is a left direction, a right direction may not be considered or vice versa. The subject vehicle steering input evaluation evaluates whether or not the driver performs the steering manipulation (steering wheel manipulation) and that the change to the warning level 2 state is made when the driver tries to change the lane. At this point, if the steering manipulation is the left direction, the right direction may not be considered or vice versa. The subject vehicle lane location evaluation evaluates the location and/or the lateral motion of the subject vehicle in the lane and thus the change to the warning level 2 state is made when the subject vehicle moves forward or enters the lane to the left. At this point, if the motion direction is the left direction, the right direction may not be considered or vice versa. The warning level 2 state may issue a more urgent warning than the warning level 1 state. As described above, the warning level 1 state issues only the visual warning, whereas the warning level 2 state may additionally issue the visual warning, the audible warning, and the haptic warning.

FIG. 8 is a diagram illustrating an LCDAS apparatus according to an embodiment of the present disclosure.

An LCDAS apparatus 100 according to the embodiment of the present disclosure includes a sensing device 110, a processor 120, a warning device 130, and a controller 140.

The sensing device 110, the processor 120, the warning device 130, and the controller 140 may transmit and receive information through signal communication and may perform a desired function based on the received information.

The processor 120 is an electric circuitry that executes instructions of software which thereby performs various functions described hereinafter.

The sensing device 110 senses whether the target vehicle exists in the adjacent zones of the subject vehicle, whether the target vehicle exists in the rear areas of the subject vehicle, or whether the target vehicle is a large vehicle or a compact vehicle. The sensing device 110 may be installed on a part of a radiator grille of the vehicle, for example, on the inside thereof but may be installed in any location of the vehicle as long as it is at a location where a vehicle located ahead may be sensed. In addition, the sensing device 110 may be installed at a side mirror portion outside the vehicle, but may be installed at any location of the vehicle as long as it is at a location where a side surface of the vehicle may be sensed. In addition, the sensing device 110 may be installed outside a trunk of the vehicle, but may be installed at any location of the vehicle as long as it is at a location where the rear of the vehicle may be sensed.

The processor 120 may determine the activation condition for determining whether to activate/deactivate the LCDAS function based on the sensing of the sensing device 110. As described above with reference to FIG. 7, the LCDAS may be classified into the inactive state and the active state and the processor 120 may determine the activation condition for changing from the inactive state to the active state (or vice versa). The activation condition may include the continuous activation condition that activates the LCDAS function at all times when the subject vehicle starts, the manual switch activation condition that a driver manually activates the LCDAS function using the switch operation (e.g., a toggle switch or a menu-based interface), the turn signal light activation condition that a driver activates the LCDAS when he/she activates the turn signal light, and the subject vehicle speed activation condition of activating the LCDAS function when the speed of the subject vehicle is equal to or greater than the threshold speed value.

Further, the processor 120 may determine the warning condition for determining whether to issue/un-issue the warning of the LCDAS function based on the sensing of the sensing device 110. As described above with reference to FIG. 7, the LCDAS active state may be classified into the non-warning state and the warning state and the processor 120 may determine the warning condition for changing from the non-warning state to the warning state (or vice versa). As described with reference to FIG. 6, the warning condition is the blind spot warning condition for issuing the blind spot warning when the target vehicle is located in the adjacent zones, the closing vehicle warning condition for issuing the closing vehicle warning in consideration of the maximum closing speed and the collision time of the target vehicle when the target vehicle is located in the rear zone, and the lateral condition for issuing the warning that the lateral wind is generated by the target vehicle.

In addition, the processor 120 determines the warning level evaluation condition for evaluating the warning level. As described above with reference to FIG. 7, the warning state is classified into the warning level 1 state and the warning level 2 state. The warning level 1 state is the relatively low warning level, and the warning level 2 state is the relatively high warning level. The processor 120 determines the warning level evaluation condition for changing from the warning level 1 state to the warning level 2 state (or vice versa). The warning level evaluation condition includes the turn signal light evaluation condition for changing from the level 1 to the level 2 when the driver turns on the turn signal light and a steering input evaluation condition for changing from the level 1 to the level 2 when the driver manipulates the steering of the subject vehicle (for example, steering wheel manipulation).

The warning device 130 issues a warning to the driver based on the determination of the processor 120. The warning method of the warning device 130 may include the visual warning, the audible warning, and the haptic warning. For the visual warning, the warning device 130 may be configured of a light emitting element such as an LED. Also, in consideration of a lane change situation that is a characteristic of the LCDAS, the warning device 130 may be implemented in a manner of emitting light from a part of the side mirror. Alternatively, the warning device 130 may be implemented in such a manner that it emits light from a part of an instrument panel. For the audible warning, the warning device 130 may be configured of a beep or a buzzer that generates a warning sound or implemented to generate a warning sound through a speaker inside the vehicle. For the haptic warning, the warning device 130 may be implemented as a vibration generating motor. Further, in order to immediately transmit vibration to a driver, the warning device 130 may be implemented to generate the vibration in the steering wheel or may be implemented to generate the vibration in a driver's seat.

Also, the warning device 130 may generate a warning by differentially dividing the low warning level and the high warning level. For example, only the visual warning may be generated at the low warning level, and all of the visual warning, the audible warning, and the haptic warning may be generated at the high warning level. Alternatively, the visual warning and the audible warning may be generated at the low warning level, and all of the visual warning, the audible warning, and the haptic warning may be generated at the high warning level.

The controller 140 serves to control the sensing device 110, the processor 120, and the warning device 130. For example, the controller may perform an on/off control of the sensing device 110, the processor 120, the warning device 130, a CLK synchronization control, a signal transmitting/receiving control, and the like. The controller 140 may also serve to perform an electronic control related to the operation of the vehicle. The controller 140 may be installed at any location in the vehicle according to the designer's selection. For example, the controller 140 may be installed between an engine room and a dashboard or may be provided inside a center fascia. The controller 140 may include at least one processor that may receive an electrical signal and process and output the received electrical signal. The at least one processor may be configured of at least one semiconductor chip and the related components. The at least one semiconductor chip and the associated components may be mounted on a printed circuit board that may be installed inside the vehicle.

Also, the controller 140 may output a control signal for controlling the movement of the vehicle. For example, the controller 140 may output a speed control command for controlling the speed of the subject vehicle when a blind spot warning and a closing vehicle warning are issued. The speed control command output from the controller 140 is transmitted to an electronic control unit (ECU), a brake controller, or an accelerator controller of the vehicle, such that the speed of the vehicle may be controlled. Further, for example, the controller 140 may output a steering control command for controlling the steering of the subject vehicle when the blind spot warning and the closing vehicle warning are issued. The steering control command output from the controller 140 is transmitted to the electronic control unit (ECU) and a steering wheel controller of the vehicle, such that the steering of the vehicle may be controlled.

Preferably, the controller 140 may output a command for controlling the damping of the subject vehicle or a command for controlling a height of the subject vehicle when the lateral wind generation warning is issued. (1) When the target vehicle is a compact vehicle, the closing speed of the target vehicle is a positive value, and the target vehicle is in the adjacent zones, the lateral wind generation warning is issued, and the controller 140 controls the damping of the subject vehicle in response thereto. Since the target vehicle is a compact vehicle, the amount of lateral wind generated is smaller than that of the large vehicle, and therefore the height control of the vehicle providing the sense of difference to the driver is not involved but any control is not performed in the case of the rear zone. (2) When the target vehicle is a large vehicle, the closing speed of the vehicle is a positive value, and the target vehicle is in the rear zone, the lateral wind generation warning is issued, and the controller 140 controls the vehicle height of the subject vehicle to be lowered in response thereto. (3) When the target vehicle is a large vehicle, the closing speed of the target vehicle is a positive value, and the target vehicle is in the adjacent zones, the lateral wind generation warning is issued, and the controller 140 controls the damping of the subject vehicle in response thereto.

FIG. 9 is a flow chart for explaining an LCDAS control method according to an embodiment of the present disclosure.

The LCDAS control method described with reference to FIG. 9 may be performed by the LCDAS apparatus illustrated in FIG. 8.

Referring to FIG. 9, step S910 of sensing whether the target vehicle exists in the adjacent zones or the rear zone and whether the target vehicle is a compact vehicle or a large vehicle is illustrated. As described with reference to FIG. 6, the adjacent zones include the left adjacent zone and the right adjacent zone. The rear zones include the left rear zone and the right rear zone. The compact vehicle may be, for example, a passenger car, and the large vehicle may be, for example, a bus, a truck, a trailer, and the like.

Next, step (S920) of determining the activation condition of activation/deactivation of the LCDAS function is illustrated. As described above with reference to FIG. 7, the LCDAS may be classified into the inactive state and the active state and the processor 120 may determine the activation condition for changing from the inactive state to the active state (or vice versa). The activation condition may include the continuous activation condition that activates the LCDAS function at all times when the subject vehicle starts, the manual switch activation condition that a driver manually activates the LCDAS function using the switch operation (e.g., a toggle switch or a menu-based interface), the turn signal light activation condition that a driver activates the LCDAS when he/she activates the turn signal light, and the subject vehicle speed activation condition of activating the LCDAS function when the speed of the subject vehicle is equal to or greater than the threshold speed value.

Next, step (S930) of determining the warning condition of issuance/un-issuance of the LCDAS function is illustrated. As described above with reference to FIG. 7, the LCDAS active state may be classified into the non-warning state and the warning state and the processor 120 may determine the warning condition for changing from the non-warning state to the warning state (or vice versa). As described with reference to FIG. 6, the warning condition includes the blind spot warning condition for issuing the blind spot warning when the target vehicle is located in the adjacent zones, the closing vehicle warning condition for issuing the closing vehicle warning in consideration of the maximum closing speed and the collision time of the target vehicle when the target vehicle is located in the rear zone, and the lateral condition for warning whether the lateral wind is generated by the target vehicle. In the lateral wind condition, (1) when the target vehicle is a compact vehicle, the closing speed of the target vehicle is a positive value, and the target vehicle is in the adjacent zones, the lateral wind generation warning is issued, (2) when the target vehicle is a large vehicle, the closing speed of the vehicle is a positive value, and the target vehicle is in the rear zone, the lateral wind generation warning is issued, and (3) when the target vehicle is a large vehicle, the closing speed of the vehicle is a positive value, and the target vehicle is in the adjacent zones, the lateral wind generation warning is issued.

Next, step (S940) of determining the warning level evaluation condition is illustrated. As described above with reference to FIG. 7, the warning state is classified into the warning level 1 state and the warning level 2 state. The warning level 1 state is the relatively low warning level, and the warning level 2 state is the relatively high warning level. The processor 120 determines the warning level evaluation condition for changing from the warning level 1 state to the warning level 2 state (or vice versa). The warning level evaluation condition includes the turn signal light evaluation condition for changing from the level 1 to the level 2 when the driver turns on the turn signal light and a steering input evaluation condition for changing from the level 1 to the level 2 when the driver manipulates the steering of the subject vehicle (for example, steering wheel manipulation).

Next, step (S950) for issuing the warning to the driver is illustrated. The warning method may include the visual warning, the audible warning, and the haptic warning. Also, the warning device 130 may generate a warning by differentially dividing the low warning level and the high warning level. For example, only the visual warning may be generated at the low warning level, and all of the visual warning, the audible warning, and the haptic warning may be generated at the high warning level. Alternatively, the visual warning and the audible warning may be generated at the low warning level, and all of the visual warning, the audible warning, and the haptic warning may be generated at the high warning level.

Next, step (S960) of controlling the speed of the vehicle, the steering of the vehicle, the height of the vehicle, and the damping of the vehicle is illustrated. For example, the speed control command for controlling the speed of the subject vehicle may be output when the blind spot warning or the closing vehicle warning is issued. The output speed control command is transmitted to the electronic control unit (ECU), the brake controller, or the accelerator controller of the vehicle, such that the speed of the vehicle may be controlled. Further, for example, the steering control command for controlling the steering of the subject vehicle may be output when the blind spot warning or the closing vehicle warning is issued. The output steering control command is transmitted to the electronic control unit (ECU) and the steering wheel controller of the vehicle, such that the steering of the vehicle may be controlled. Further, when the lateral wind generation warning is issued, the damping of the vehicle or the height of the vehicle may be controlled. Specifically, (1) when the target vehicle is a compact vehicle, the closing speed of the target vehicle is a positive value, and the target vehicle is in the adjacent zones, the lateral wind generation warning is issued, and a step of outputting a command for controlling the damping of the subject vehicle in response thereto may be performed. Since the target vehicle is a compact vehicle, the amount of lateral wind generated is smaller than that of the large vehicle, and therefore the height control of the vehicle providing the sense of difference to the driver is not involved but any control is not performed in the case of the rear zone. (2) When the target vehicle is a large vehicle, the closing speed of the vehicle is a positive value, and the target vehicle is in the rear zone, the lateral wind generation warning is issued, and a step of outputting a command for controlling the height of the subject vehicle to be lowered in response thereto may be performed. (3) When the target vehicle is a large vehicle, the closing speed of the vehicle is a positive value, and the target vehicle is in the adjacent zones, the lateral wind generation warning is issued, and a step of outputting a command for controlling the damping of the subject vehicle in response thereto may be performed.

Meanwhile, it should be understood that the LCDAS was described as an example for convenience of description in the present specification. As described above, it should be understood that the LCDAS is only one of several ADAS functions as described above, and that the LCDAS implementations presented by the present disclosure may also be used to implement other ADAS functions involved. For example, the system presented by the present disclosure may be applied to implement one or a combination of ones of the ADAS functions such as the LCDAS, a land departure warning system (LDWS), an adaptive cruise control (ACC), a lane keeping assistance system (LKAS), a road boundary departure prevention system (RBDPS), a pedestrian detection and collision mitigation system (PDCMS) a curve speed warning system (CSWS), a forward vehicle collision warning system (FVCWS), and low speed following (LSF).

In one or more exemplary embodiments, the described functions may be achieved by hardware, software, firmware, or any combinations thereof. If achieved by software, the functions may be stored or transmitted as one or more commands or codes in a computer-readable medium. The computer-readable medium includes all of communication media and computer storage media including any media that facilitate a transmission of computer programs from one location to another location. The storage media may be any available media that may be accessed by a computer. By way of example, not limitation, the computer-readable medium may include RAM, ROM, EEPROM, or CD-ROM, other optical disk storages, magnetic disk storages or other magnetic storage devices, or any other medium that may be used to transmit or store a desired program code in a form of a command or data structure. Also, any connection is properly referred to as a computer readable medium. For example, if software is transmitted from a website, server, or other remote sources using wireless technologies such as a coaxial cable, a fiber optic cable, a twisted pair cable, and a digital subscriber line (DSL) or wireless technologies such as infrared, radio, and microwave, the coaxial cable, the fiber optic cable, the twisted pair cable, and the DSL or the wireless technologies such as the infrared, the radio, and the microwave are included in the definition of the medium. A disk (and disc) as used herein includes a compact disc (CD), a laser disc, an optical disc, a digital versatile disc (DVD), a floppy disc, and a Blu-ray disc. Here, the discs generally reproduce data magnetically, while the discs optically reproduce data by a laser. The foregoing combinations should also be included within the scope of computer-readable medium.

When embodiments are implemented as a program code or code segments, the code segment should be recognized as representing a procedure, a function, a subprogram, a program, a routine, a subroutine, a module, a software package, a class, or any combinations of commands, data structures, or program statements. The code segment may transmit and/or receive information, data, argument, parameter, or memory content to be connected to another code segment or hardware circuit. The information, the data, the argument, the data, or the like may be communicated, sent, or transmitted using any suitable means including memory sharing, message transmission, token transmission, network transmission, etc. In addition, in certain aspects, steps and/or operations of a method or an algorithm may reside as one or any combination or a set of codes and/or commands performed on one or more of the codes and/or instructions on a machine-readable medium and/or computer-readable medium that may be integrated into a computer program article.

In an implementation of software, the techniques described herein may be implemented by modules (e.g., procedures, functions, etc.) that perform the functions described herein. The software codes may be stored in memory units and executed by processors. The memory units may be implemented in processors or outside the processors. In this case, the memory units may communicate with the processors by various means as known.

In the implementation of the hardware, the functions may be implemented in one or more application specific integrated circuits (ASICs), a digital signal processor (DSP), a digital signal processing device (DSPD), a programming function logic device (PLD), a field programmable gate array (FPGA), a processor, a controller, a microcontroller, a microprocessor, other electronic units designed to perform the functions described herein, or combinations thereof.

The foregoing includes examples of one or more embodiments. Of course, all possible combinations of components or methods for the purpose of describing the embodiments described above are not described, but those skilled in the art may recognize that many combinations and substitutions of various embodiments are possible. Accordingly, the described embodiments are intended to embrace all the alternatives, modifications and variations that fall within the spirit and scope of the appended claims. Moreover, in connection with the extent that the term "include" in the detailed description or the appended claims is used, the term are intended to be inclusive in a manner similar to "consisting" as interpreted when the term "configured" is used as a transitional word in the appended claim.

As used herein, the term "infer" or "inference" generally refers to a process of determining or inferring a state of system, environment, and/or user from a set of observations captured by events and/or data. The inference may be used to identify a particular situation or operation or may generate a probability distribution for, for example, states. The inference may be probabilistic, that is, may be a computation of the probability distribution for the corresponding states based on a consideration of data and events. The inference may also refer to techniques used to construct higher level events from a set of events and/or data. The inference may be estimated based on new events or operations from a set of observed events and/or stored event data, whether the events are closely correlated in time, and whether events and data are coming from one or several events and data sources.

Moreover, as used in the present application, the terms "component," "module," "system," and the like are not limited thereto but are intended to encompass hardware, firmware, a combination of the hardware and the software, computer-related entities such as software or software that is being executed. For example, the component is not limited thereto, but may be a process executed on a processor, a processor, an object, an executable execution thread, a program and/or a computer. By way of example, all of an application running on a computing device and a computing device may be a component. One or more component may reside within the process and/or the execution thread, and the components may be centralized on one computer and/or distributed between two or more computers. Further, the components may also be executed from various computer readable media having various data structures stored thereon. The components may communicate by a local and/or remote process depending on a signal or the like having one or more data packet (e.g., data from a local system, other components of the distributed system, and/or any component interacting with other systems via a network, such as the Internet by a signal).

What is claimed is:

1. A lane change decision aid system (LCDAS) apparatus, comprising:
    a sensor for sensing whether a target vehicle is in adjacent zones of a subject vehicle or whether the target vehicle is in a rear zone of the subject vehicle, wherein the adjacent zones are within a first predetermined distance from the subject vehicle, and the rear zone extends from the adjacent zones and is within a second predetermined distance from the subject, the second predetermined distance being greater than the first predetermined distance;
    a processor for determining an activation condition for determining whether an LCDAS function is active/inactive and a warning condition for determining whether a warning of the LCDAS function is issued/un-issued, based on whether the target vehicle is in the adjacent zones or whether the target vehicle is in the rear zone of the subject vehicle;

a warning device for issuing the warning to a driver based on a determination result of the processor; and
a controller for controlling the sensor, the processor, and the warning device,
wherein the activation condition includes a turn signal light activation condition of activating the LCDAS function when the driver turns on a turn signal light,
the processor determines that a right LCDAS function is inactivated and a left LCDAS function is activated when the driver turns on a left turn signal light, and
the processor suppresses a warning when the target vehicle enters the adjacent zones from a front direction.

2. The LCDAS apparatus of claim 1, wherein the activation condition further includes at least one of:
a continuous activation condition of activating the LCDAS function at all times when the subject vehicle starts;
a manual switch activation condition of allowing the driver to activate the LCDAS function using a switch operation; and
a subject vehicle speed activation condition of activating the LCDAS function when a speed of the subject vehicle is equal to or greater than a threshold speed value.

3. The LCDAS apparatus of claim 2, wherein the warning condition includes at least one of:
a blind spot warning condition of issuing a blind spot warning when the target vehicle is located in the adjacent zones; and
a closing vehicle warning condition of issuing a closing vehicle warning when the target vehicle is located in the rear zone and when a maximum closing speed and a collision time of the target vehicle satisfy a preset condition.

4. The LCDAS apparatus of claim 3, wherein the processor is additionally configured to determine a warning level evaluation condition for evaluating a warning level, and
the warning level evaluation condition includes at least one of:
a turn signal light evaluation condition determined as a high warning level when the driver turns on the turn signal light; and
a steering input evaluation condition determined as the high warning level when the driver manipulates a steering of the subject vehicle.

5. The LCDAS apparatus of claim 2, wherein the warning condition includes a blind spot warning condition of issuing a blind spot warning when the target vehicle is located in the adjacent zones, and
the processor suppresses an issuing of the blind spot warning for a period when subject vehicle passes the target vehicle and the target vehicle enters the adjacent zones from the front direction.

6. The LCDAS apparatus of claim 4, wherein the warning includes a visual warning and an audible warning at a low warning level, and
the warning includes a visual warning, an audible warning, and a haptic warning at the high warning level.

7. The LCDAS apparatus of claim 3, wherein the controller outputs a speed control command controlling the speed of the subject vehicle or a steering control command controlling a steering of the subject vehicle, corresponding to an issuance of the blind spot warning or an issuance of the closing vehicle warning.

8. The LCDAS apparatus of claim 3, wherein the processor additionally determines a lateral wind condition for issuing a lateral wind generation warning, and in the lateral wind condition, when the target vehicle is a compact vehicle, a closing speed of the target vehicle is a positive value, and the target vehicle is in the adjacent zones, the lateral wind generation warning is issued and the controller outputs a command for controlling a damping of the vehicle in response to the lateral wind generation warning.

9. The LCDAS apparatus of claim 3, wherein the processor additionally determines a lateral wind condition for issuing a lateral wind generation warning, and
in the lateral wind condition, when the target vehicle is a large vehicle, a closing speed of the target vehicle is a positive value, and the target vehicle is in the rear zone, the lateral wind generation warning is issued and the controller outputs a command for controlling a height of the vehicle to be lowered in response to the lateral wind generation warning.

10. The LCDAS apparatus of claim 9, wherein in the lateral wind condition, when the target vehicle is the large vehicle, the closing speed of the target vehicle is the positive value, and the target vehicle is in the adjacent zones, the lateral wind generation warning is issued and the controller outputs the command for controlling the damping of the vehicle in response to the lateral wind generation warning.

11. The LCDAS apparatus of claim 10, wherein the large vehicle is any one of a bus, a truck, and a trailer.

12. A lane change decision aid system (LCDAS) control method, comprising steps of:
sensing, by a sensor, whether a target vehicle is in adjacent zones of a subject vehicle or whether the target vehicle is in a rear zone of the subject vehicle, wherein the adjacent zones are within a first predetermined distance from the subject vehicle, and the rear zone extends from the adjacent zones and is within a second predetermined distance from the subject, the second predetermined distance being greater than the first predetermined distance;
determining, by a processor, an activation condition for determining whether an LCDAS function is active/inactive, based on whether the target vehicle is in the adjacent zones or whether the target vehicle is in the rear zone of the subject vehicle;
determining, by the processor, a warning condition for determining whether the warning of the LCDAS function is issued/un-issued based on the sensing result of the sensor; and
issuing, by a warning device, a warning to a driver based on a determination result of the processor,
wherein the activation condition includes a turn signal light activation condition of activating the LCDAS function when the driver turns on a turn signal light,
the determining the activation condition comprises determining that a right LCDAS function is inactivated and a left LCDAS function is activated when the driver turns on a left turn signal light, and
the method further includes suppressing a warning when the target vehicle enters the adjacent zones from a front direction.

13. The LCDAS control method of claim 12, wherein the activation condition further includes at least one of:
a continuous activation condition of activating the LCDAS function at all times when the subject vehicle starts;
a manual switch activation condition of allowing the driver to activate the LCDAS function using a switch operation; and a subject vehicle speed activation condition of activating the LCDAS function when a speed of the subject vehicle is equal to or greater than a threshold speed value.

14. The LCDAS control method of claim 13, wherein the warning condition includes at least one of:
   a blind spot warning condition of issuing a blind spot warning when the target vehicle is located in the adjacent zones; and
   a closing vehicle warning condition of issuing a closing vehicle warning when the target vehicle is located in the rear zone and when a maximum closing speed and a collision time of the target vehicle satisfy a preset condition.

15. The LCDAS control method of claim 14, further comprising a step of:
   determining a warning level evaluation condition for evaluating a warning level,
   wherein the warning level evaluation condition includes at least one of:
   a turn signal light evaluation condition determined as a high warning level when the driver turns on the turn signal light; and
   a steering input evaluation condition determined as the high warning level when the driver manipulates a steering of the subject vehicle.

16. The LCDAS control method of claim 15, wherein the step of issuing a warning includes:
   issuing a visual warning at a low warning level; and
   issuing a visual warning, an audible warning, and a haptic warning at a high warning level.

17. The LCDAS control method of claim 14, further comprising a step of:
   outputting a command controlling the speed of the subject vehicle or the steering of the subject vehicle, corresponding to an issuance of the blind spot warning or an issuance of the closing vehicle warning.

18. The LCDAS control method of claim 14, further comprising a step of:
   determining a lateral wind condition for issuing a lateral wind generation warning,
   wherein in the lateral wind condition, when the target vehicle is a compact vehicle, a closing speed of the target vehicle is a positive value, and the target vehicle is in the adjacent zones, the lateral wind generation warning is issued and a command for controlling a damping of the vehicle in response to the lateral wind generation warning is output.

19. The LCDAS control method of claim 14, further comprising a step of:
   determining a lateral wind condition for issuing a lateral wind generation warning,
   wherein in the lateral wind condition, when the target vehicle is a large vehicle, a closing speed of the target vehicle is a positive value, and the target vehicle is in the rear zone, the lateral wind generation warning is issued and a command for controlling a height of the vehicle to be lowered in response to the lateral wind generation warning is output.

20. The LCDAS control method of claim 19, wherein in the warning condition, when the target vehicle is the large vehicle, the closing speed of the target vehicle is the positive value, and the target vehicle is in the adjacent zones, the lateral wind generation warning is issued and a command for controlling a damping of the vehicle in response to the lateral wind generation warning is output.

* * * * *